United States Patent [19]

DeHaan et al.

[11] Patent Number: 4,963,255
[45] Date of Patent: Oct. 16, 1990

[54] PLATE SHIFTER FOR FILTER PRESS

[75] Inventors: Daniel DeHaan, Zeeland Township, Ottawa County; Michael J. Brinks, Heath Township, Allegan County; Sherwood Steketee, Saugatcuk Township, Allegan County, all of Mich.

[73] Assignee: JWI, Inc., Holland, Mich.

[21] Appl. No.: 360,549

[22] Filed: Jun. 2, 1989

[51] Int. Cl.⁵ .................................... B01D 25/172
[52] U.S. Cl. .................................... 210/230; 210/236; 100/199
[58] Field of Search .................. 210/225, 230, 236; 100/198, 199; 198/746

[56] References Cited

U.S. PATENT DOCUMENTS 4,806,239  2/1989  Davis .................. 210/230

*Primary Examiner*—Peter Hruskoci
*Assistant Examiner*—Matthew O. Savage
*Attorney, Agent, or Firm*—Flynn, Thiel, Boutell & Tanis

[57] ABSTRACT

An apparatus for effecting separation of filter plates within a filter press, which apparatus includes first and second filter plate engaging pawls pivotally mounted on a carrier which is supported for generally linear back and forth movement longitudinally of the filter press. The pawls have adjacent free ends which define thereon generally opposed abutment surfaces adapted for engaging opposite sides of a filter plate. One pawl is spring urged into a raised position, and this one pawl has an upper camming surface adapted for contact with a bottom surface on the filter plate to urge the first pawl into a lowered position. The other pawl is pivotally mounted in a manner free of springs, and has an upwardly projecting cam lug which defines the respective abutment surface on one side, and a camming surface on the other side. The pawls each have a stop which projects outwardly beyond the respective abutment surface, and the stop on the other lever is positioned above the stop on the one lever so that upward swinging of the one lever causes corresponding upward swinging of the other lever.

6 Claims, 2 Drawing Sheets

PLATE SHIFTER FOR FILTER PRESS

FIELD OF THE INVENTION

This invention relates to a filter press and more particularly to a mechanism for shifting the plates of the filter press to enable the filter cake to be removed therefrom.

BACKGROUND OF THE INVENTION

A number of different types of plate shifters have been devised in an attempt to facilitate the shifting of filter plates as used in filter presses. Such plate shifter have typically involved mechanisms which are complex and subject to failure when, for example, the filter press becomes dirty due to sludge or other contaminating materials accumulating thereon.

One conventional type of plate shifter mechanism involves a support carriage which is movable longitudinally along the filter press frame and mounts thereon a pair of pawls which are designed for cooperation with opposite sides of the individual plates to effect shifting thereof. In such mechanism, the two shifting pawls generally operate wholly independently of one another, and are each individually spring biased into an upper position, whereby they are configured to cooperate with the filter plates to perform the desired shifting function. Such arrangement, an example of which is illustrated by U.S. Pat. No. 3 306 455, introduces greater operational and structural complexity inasmuch as each shifting pawl is pivotal independently of the other and is independently spring urged, thereby not only increasing the structural complexity but also increasing the possibility of failure or malfunction due to the independent relationship between the pawls.

Accordingly, this invention relates to an improved plate-shifter mechanism employing a pair of movable shifter pawls, only one of which is spring biased, which pawls structurally and functionally cooperate with one another during the plate-shifting function so as to result in a mechanism having increased structural and operational simplicity and dependability.

More specifically, the improved plate-shifter mechanism of this invention includes a support carriage which is movable in a linear reciprocal manner in the lengthwise direction of the filter press. This support carriage mounts thereon, in longitudinally spaced relation, a pair of pivotal shifting pawls disposed in opposed relationship. The pawls, in the vicinity of the free ends, have upper cam surfaces which functionally cooperate with the sidewardly-projecting drive lugs associated with the filter plates. The first shifting pawl is spring urged upwardly toward the drive lugs, whereas the second shifting pawl is free of springs. This second shifting pawl, adjacent the free end thereof, is provided with a projecting nose part which projects into a clearance slot formed adjacent the free end of the first pawl, whereby the second pawl is free to move either independently of the first pawl or in controlled synchronous movement with the first pawl.

Other objects and purposes of the invention will be apparent to persons familiar with structures of this general type upon reading the following specification and inspecting the accompanying drawings.

Figure 1:
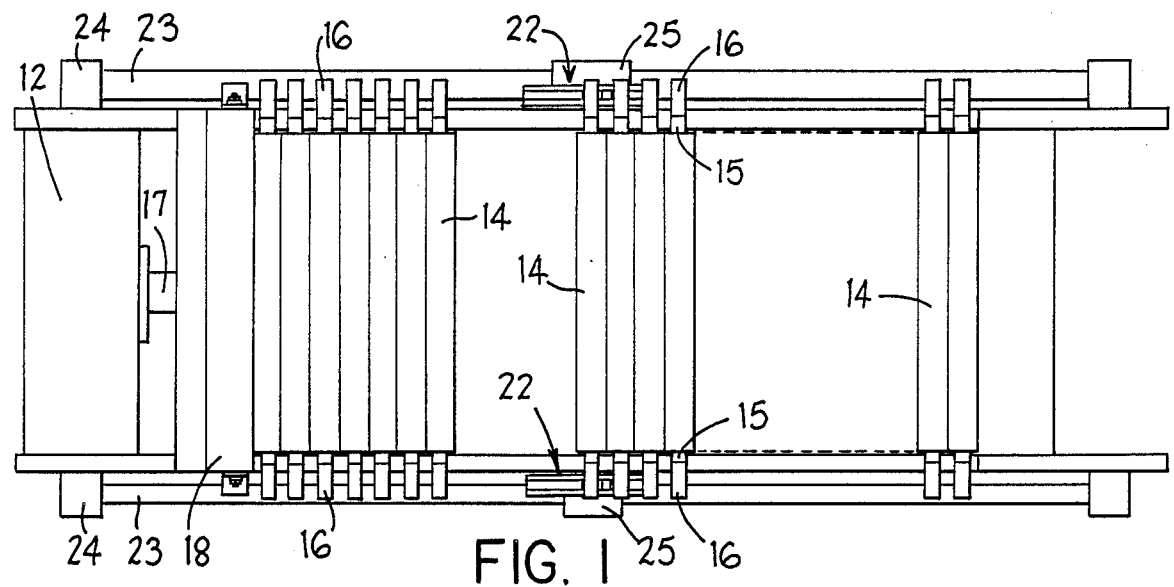
FIG. 1 is a diagrammatical top view of a filter press incorporating a plate shifter thereon.

Certain terminology will be used in the following description for convenience in reference only, and will not be limiting. For example, the words "upwardly", "downwardly", "rightwardly" and "leftwardly" will refer to directions in the drawings to which reference is made. The word "forward" will be used in relationship to leftward shifting of the filter plates in FIGS. 1 and 2, and the word "rearward" will refer to rightward shifting of the filter plates in FIGS. 1 and 2. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

Figure 2:
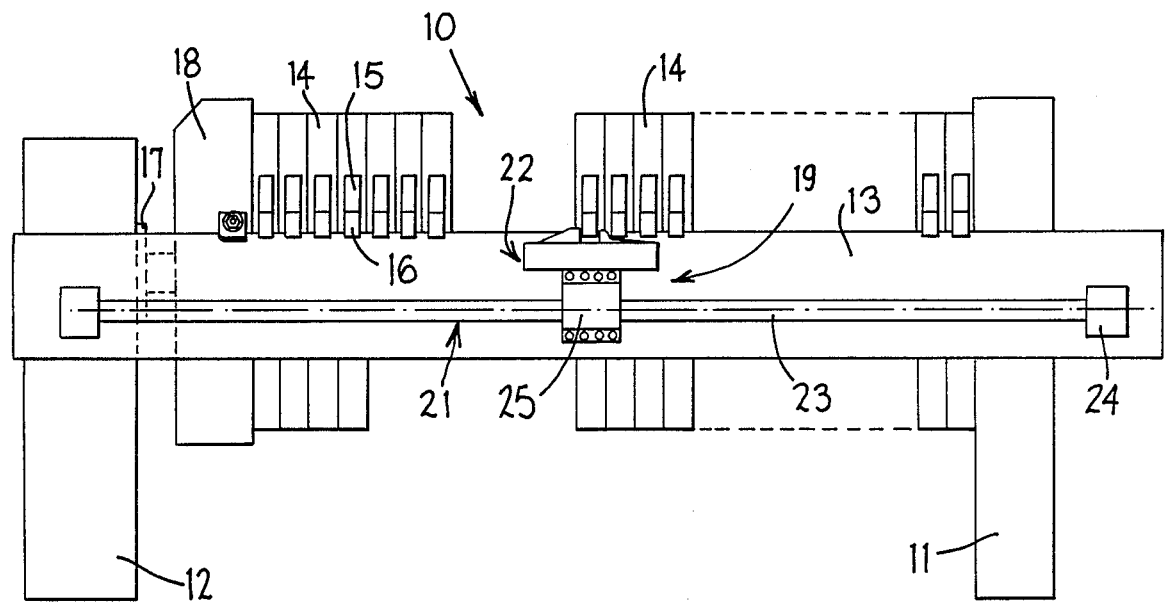
FIG. 2 is a diagrammatical side elevational view of the filter press shown in FIG. 1.

As shown in FIGS. 1 and 2, there is illustrated a somewhat conventional filter press 10 having a pair of end supports 11 and 12 rigidly joined together by a pair of generally parallel and horizontally elongate rails 13, which rials and end supports hence define a generally rigid frame. The rails 13 are sidewardly spaced apart, and a plurality of conventional filter plates 14 are suspendingly supported therebetween. Each filter plate 14, in a generally conventional manner, has a pair of support arms 15 which project outwardly from opposite sides of the filter plate so as to slidably support the respective filter plate for longitudinal movement along the rails 13. Each arm 15 also has an outer part 16 which projects slightly downwardly below the upper surface of the respective rail 13 adjacent the outer side thereof. These support arms 15 and their respective parts 16 normally have a width in the lengthwise direction of the filter press which is significantly less than the width of the respective filter plate 14, whereby adjacent support arm parts 16 thus define clearance spaces of predetermined width therebetween when adjacent filter plates 14 are in abutting engagement, substantially as illustrated by FIG. 2.

The filter press 10 also has a movable follower or head plate arrangement 18 which is disposed adjacent one end of the press frame and is slidably supported for movement along the side rails 13 This follower 18 is slidably displaced horizontally along the rials by means of a suitable driving device 17, such as a conventional fluid pressure cylinder. This follower 18, and the opposed end support 11, which in effect defines a stationary pressure head, cooperate to confine the plurality of filter plates 14 therebetween, which plates are disposed in a generally horizontally stacked relationship.

As is conventional, under normal operation, the driving device 17 is activated to move the movable pressure head or follower 18 rightwardly in FIG. 2 so that the stack of filter plates 14 are snugly and tightly held between the opposed heads 11 and 11. These opposed heads 11 and 18 have suitable conduits (not shown) connected therethrough for communication with the interior of the stack of filter plates. A slurry is supplied through one of the heads into the stack of filter plates, and the cleaned liquid flows outwardly through the head at the other end, whereupon the solids collect on the filters which extend across the frames defining the filter plates.

To permit removal or dumping of the solids which collect on the filter plates, the movable head 18 is moved into an opened position substantially as illustrated by solid lines in FIG. 2, and then the plates 14 are individually moved leftwardly away from the stack toward the head 18 to permit the solids to drop downwardly for deposit into a suitable collecting bin. To effect this sequential and individual movement of the filter plates 14, the filter press 10 has a plate shifter arrangement 19 which includes a drive device 21 for effecting movement of a plate shifter mechanism 22 longitudinally along the side rails 13.

In the illustrated embodiment, the drive mechanism 21 is illustrated as a conventional rodless fluid pressure cylinder formed by an elongate hollow tube 23 which extends longitudinally along the outside of each side rail 13 and is suitably anchored at opposite ends by supports 24. This hollow tube 23 has a conventional piston longitudinally slidably supported therein so that the tube is divided into pneumatic pressure chambers on opposite sides of the piston. The tube 23 has a slot in the bottom side thereof extending longitudinally throughout its length, the slot being closed by an elongate seal. A bracket is secured to the piston and projects outwardly through the seal in the elongate slot, and is fixedly joined to a carriage 25 which surrounds and is slidably supported exteriorly on the tube 23. This carriage 25 in turn mounts thereon the plate shifter mechanism 22 so as to control the linear reciprocating movement of the plate shifter mechanism 22 longitudinally along each side rail.

Attention is directed to U.S. Pat. No. 4 806 239 wherein such an arrangement, employing a rodless cylinder, is explained in detail.

The overall shifter mechanism 19, as illustrated by FIG. 1, includes a driving device 21 and a shifter mechanism 22 provided adjacent the outer side of each of the side rails 13.

The present invention relates specifically to improvements in the plate shifter mechanism 22, which mechanism is illustrated and described with reference to FIGS. 3–5.

The shifter mechanism 22 includes a support carrier 31 which is fixedly mounted on the support 25. The support carrier 31 in the illustrated embodiment is a generally upwardly-opening channel which is horizontally elongated generally parallel to the adjacent side rail 13. This carrier 31 supports therein a first pawl or lever 32 which is pivotally supported on the carrier 31 by a suitable pivot pin 33, the latter defining a generally horizontal pivot axis which extends perpendicular with respect to the direction of movement of the filter plates, which direction of movement is in the lengthwise extent of the side rails 13. The carrier 31 also supports a second pawl or lever 34 therein, the latter being supported by a pivot pin 35 whose axis is sidewardly spaced from but generally parallel with the axis of the pivot pin 33. The pivot pins 33 and 35 are substantially spaced apart and in fact are disposed adjacent the opposite ends of the carrier 31. The pawls 32 and 34 themselves project from the respective pivot pins generally inwardly toward one another so that the free ends of the pawls are disposed in closely adjacent relationship. Further, as is evident from inspection of FIGS. 3–5, the pawls 32 and 34 project generally horizontally toward one another.

The first pawl 32, adjacent the free end thereof, is provided with a lug or projection 41 which projects upwardly from the upper surface thereof in a generally cantilevered relationship. This upwardly projecting lug 41 serves as a cam part and defines a rounded cam surface 42 on one side thereof, namely the side closest to the hinge 33, and a generally flat abutment surface 43 on the other side thereof. This first lever 32 also has a further lug or projecting part 44 adjacent the free end thereof, which lug 44 projects outwardly beyond the abutment surface 43 generally in the elongate direction of the pawl so as to define the tip or free end of the pawl 32. This projection 44 defines thereon an upper surface 45 which extends generally transversely with respect to the lower edge of the abutment surface 43, whereby these surfaces 43 and 45 thus define an upwardly opening clearance space adjacent the free end of the pawl 32.

The second pawl 34 adjacent its free end defines thereon a generally transversely extending abutment surface 47 which, at its upper edge, joins to a generally flat cam surface 53 formed on the upper surface of the pawl 34. This cam surface 53 extends lengthwise along the pawl 34 by a distance sufficient to span the gap between adjacent contacting filter plates 14. This second pawl 34 also has a small lug 48 which projects outwardly generally in the elongate direction of the pawl 34 so as to project outwardly beyond the abutment surface 47. The lug 48 is spaced downwardly adjacent the lower edge of the end abutment surface 47, and this lug 48 defines thereon an upwardly facing stop 49 which extends transversely relative to the abutment surface 47.

Figure 3:
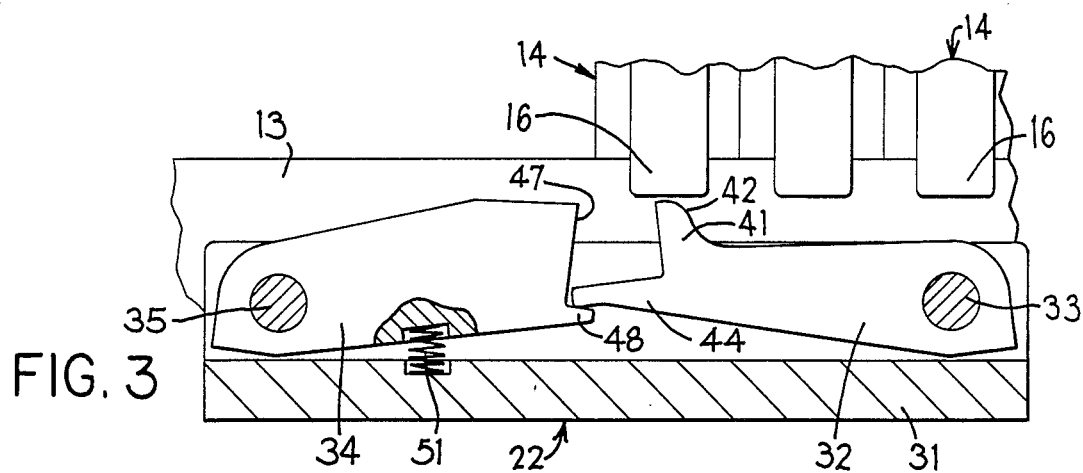
FIGS. 3–5 are enlarged fragmentary views illustrating the inventive shifter mechanism and its cooperation with the filter plates during various stages of the shifting function.
Figure 4:
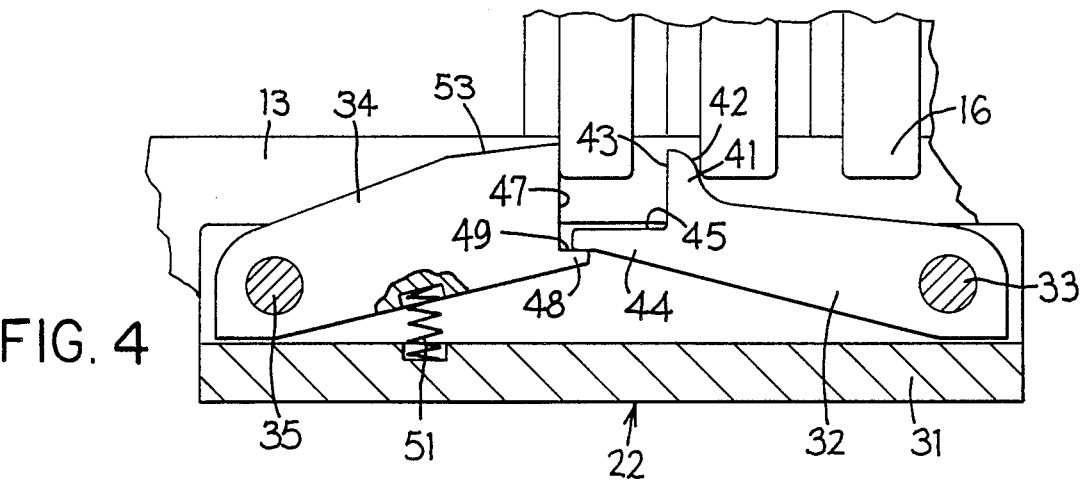
Figure 5:
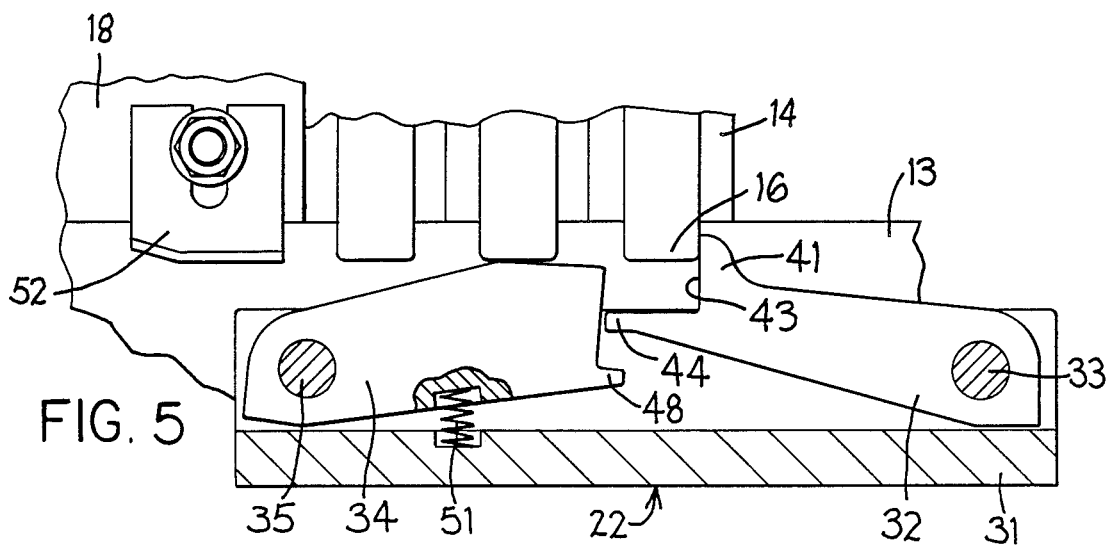

As illustrated by each of FIGS. 3–5, the length of the pawls 32 and 34 is such that the free end of the lug 44 on pawl 32 is disposed above and vertically overlaps the projecting lug 48 formed on the other pawl 34, so as to define a downwardly facing stop. These overlapping lugs 44 and 48, and their cooperation with the abutment surfaces 43 and 47, the latter being disposed in generally opposed relationship, hence define therebetween a generally upwardly opening channel for accommodating therein a single downwardly-depending support arm part 16 as associated with a filter plate 14.

The pawl 34 is also normally biased in an upward direction by means of a small spring 51 which cooperates between the bottom of the carrier 31 and the underside of the pawl 34. This spring normally urges the pawl 34 into an uppermost position substantially as illustrated by FIG. 4, in which uppermost position the pawl is maintained by engagement with a suitable stop (not shown). The other pawl 32, however, is not directly acted on by springs or other resilient devices. Rather, this pawl 32 is freely pivotally supported by the pivot pin 33 and will freely pivotally move downwardly due to the urging of gravity. Hence, the lowermost position of the lever 32 will always be governed by the position of the pawl 34 and the engagement of the lug 44 on the lug 48.

The operation of the shifter mechanism 22 will now be briefly described to ensure a complete understanding thereof.

Initially, the movable press head 18 is moved rightwardly in FIG. 2 so that all of the filter plates 14 are tightly stacked between the heads 11 and 18. In the operational position, the shifter mechanism 22 is normally stored adjacent the leftward end of the filter press. When dumping of the solid material from the filter press is desired, the head 18 is moved leftwardly into an open or dumping position, and then the shifting apparatus 19 is activated so as to sequentially and individually move the plates 14 associated with the stack, as appearing rightwardly in FIGS. 1 and 2, away from the stack so as to be moved into a position adjacent the movable head 18, substantially as illustrated adjacent the left side of FIG. 2. This hence effects individual separation between each adjacent pair of plates 14 so as to permit dumping of the solid material.

More specifically, after the head 18 is in the open position illustrated by solid lines in FIGS. 1 and 2, then the shifter mechanism 22 is moved rightwardly by the pressure cylinder 21. During this rightward movement, the pawls 32 and 34 are maintained in their upper positions, which positions are illustrated by FIG. 4. Upon reaching the endmost filter plate 14, the camming surface 42 on the lug 41 engages the downwardly depending part 16 of the filter plate support arm 15 and, due to the continued rightward movement of the carrier 31 as illustrated in FIG. 1, the pawl 32 is pivotally swung downwardly so as to move beneath the arm part 16. At the same time, the engagement of the lug 44 on the lug 48 causes a corresponding downward swinging of the pawl 34 in opposition to the urging of the spring 51. The pawls remain in the depressed condition of FIG. 3 until the lug 41 moves past the depending support arm part 16, whereupon spring 51 acting upwardly on the arm 34 then also causes the pawl 32 to swing upwardly whereby the lug 41 enters into the clearance space between the adjacent support arm parts 16. At the same time, the downwardly depending support arm part 16 projects into the space defined between the opposed abutment surfaces 43 and 47. The carrier 31 continues to move rightwardly until the abutment surface 47 engages the front side surface of the support arm part 16 associated with the endmost filter plate. When this engagement happens, the carrier 31 can no longer move rightwardly, whereupon pressure buildup then incurs within the pressure cylinder 23 and, in response to reaching a predetermined pressure, a conventional control system reverses the energization of the pressure cylinder so that it is now reversely energized so as to effect leftward movement of the carrier 31.

During the initial leftward movement, the carrier 31 moves relative to the filter plates until the abutment surface 43 on the pawl 32 engages the rear side surface on the downwardly depending support arm 16 of the endmost filter plate 14, whereupon continued leftward movement of the carrier 31 then causes the endmost filter plate to be slidably moved leftwardly along the guide rails 13 until the filter plate abuts the stationary head 18. When closing approaching the heat 18, the cam 53 associated with the pawl 34 engages beneath a fixed cam or deflector 52 which is stationarily secured to the head 18 so as to cause the pawl 34 to be swung downwardly against the urging of the spring. However, due to the fact that the pressure cylinder is urging the abutment surface 43 of the pawl 32 against the rear face of the filter plate part 16, the friction between the opposed surfaces is sufficient to hold the pawl 32 in an upward position, such relationship being indicated approximately by FIG. 5. When the filter plate abuts the stationary end plate 18, further movement of the carrier 31 is prevented, and the pressure again builds up within the cylinder until reaching a predetermined level, at which time a pressure sensor causes reversal in the energization of the pressure cylinder.

The carrier 31 is then again moved rightwardly so as to pick up the next endmost filter plate associated with the stack. When reaching the next plate, it again cooperates with the plate in the same manner described above, as depicted by FIGS. 3 and 4. This endmost plate is then moved leftwardly until it abuts the previously moved plate and, when approaching the previously moved plate, the cam surface 53 on the pawl 34 engages the part 16 of the previously moved filter plate so as to be deflected downwardly into the position illustrated by FIG. 5, while the pawl 32 still remains in its upper driving position until the pressure buildup causes a reversal in the direction of movement of the carrier 31. When such reversal occurs, the pawl 32 will freely fall downwardly until contacting the lug 48. At the same time, the length of the cam surface 53 is sufficient as to enable it to span across the gap between the bottom surfaces of the adjacent filter plate parts 16 so that pawl 34 will remain depressed until moving outwardly beyond the adjacent stacked filter plates.

The above sequence continues until all of the filter plates have been moved from the rightward position adjacent the head 11 to the leftward position adjacent the opened head 18, thereby permitting removal of solids which collect between each adjacent pair of filter plates. After all of the filter plates have been moved into the opened leftward position, the control for the pressure cylinder will initially cause the carrier 31 to move rightwardly away from the last-shifted filter plate to enable the pawl 32 to drop downwardly, following which the pressure cylinder is then reversely energized and the carrier 31 is moved leftwardly pas the filter plates to the end of the filter press. During this leftward movement back to its original storage position, the pawl 34 is deflected downwardly so as to pass beneath the filter plate parts 16, and the free pivoting movement of the lever 32 enables it to also freely swing downwardly so as to follow the movement of the pawl 34, whereby the complete mechanism can hence pass freely beneath the filter plate parts 16. The main drive unit 17 can then again be activated to move the stack of filter plates 14 and the movable head 18 rightwardly until all of the plates 14 are tightly compressed between the heads 11 and 18. A new filtering operation is then instituted.

While the invention has been disclosed in conjunction with a rodless-type pressure cylinder for effecting reciprocating movement of the shifter mechanism 22, it will be appreciated that numerous other conventional drive devices such as rod-type pressure cylinders or chain drives can also be utilized for this purpose.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a filter press having an elongate frame, a first press head plate mounted on said frame adjacent one end thereof, a second press head plate slidably mounted on said frame adjacent the other end thereof, s a plurality of filter plates slidably supported on said frame between said first and second press head plates, a drive for moving said second press head plate longitudinally along said frame between a first closed position wherein the plurality of filter plates are snugly horizontally stacked between the press head plates and an open position wherein the second press head plate is spaced sufficiently from the first press head plate to permit slidable displacement of the individual filter plates longitudinally along the frame, and a shifter apparatus for engaging and effecting slidable shifting of individual filter plates longitudinally along said frame, said shifting apparatus including a shifting mechanism disposed for generally linear movement back and forth along the frame in the longitudinal direction thereof and a driving unit connected to said shifting mechanism for causing said linear back and forth movement, the improvement wherein said shifting mechanism comprises:

- a carrier supported for said linear back and forth movement;
- a first pawl pivotally mounted on said carrier and defining thereon a first upwardly facing stop, said first pawl being swingable between raised and lowered positions;
- spring means coacting with said first pawl for normally urging said first pawl toward said raised position;
- a second pawl pivotally mounted on said carrier and being swingable between raised and lowered positions, said second pawl defining thereon a second downwardly-facing stop which is disposed generally vertically above said first upwardly-facing stop, said second pawl being freely pivotally supported on said carrier free of biasing springs;
- said first pawl defining thereon a first abutment surface for abuttingly contacting one side of a said filter plate, said second pawl defining thereon a second abutment surface for abuttingly contacting an opposite side of aid filter plate, said fist and second abutment surfaces being disposed in generally longitudinally spaced but opposed relation to one another; and
- said second pawl having a cam part formed thereon and projecting upwardly therefrom, said cam part defining said second abutment surface on one side thereof and defining camming surface on the other side thereof, said first and second pawls projecting horizontally toward one another and terminating in free ends which are disposed in close proximity to one another and which have said abutment surfaces formed thereon, each of said first and second pawls having a lug which projects outwardly at the free end thereof beyond the respective abutment surface.

2. A filter press according to claim 1, wherein said first and second pawls are respectively supported for pivotal movement about first and second pivot axes which extend generally horizontally in substantially parallel relationship to one another, said first and second axes extending substantially perpendicularly with respect to the longitudinal direction of said frame, said first and second pawls projecting away from the respective pivot axes.

3. A filter press according to claim 2, wherein each said lug is disposed adjacent the bottom of the respective abutment surface, the lug on said second pawl defining thereon said second stop and being disposed vertically over the lug on said first pawl which defines said first stop, whereby said second pawl is maintained in its raised position due to engagement of said stops whenever said first pawl is maintained in its raised position by said spring means.

4. A filter press according to claim 3, wherein said first pawl has a generally flat and longitudinally elongate cam surface formed on the upper end thereof, said cam surface extending from adjacent said first abutment surface and being disposed for abutting contact with a bottom surface on said filter plate for urging said first pawl downwardly toward said lower position.

5. In a filter press having an elongate frame, a first press head plate mounted on said frame adjacent one end thereof, a second press head plate slidably mounted on said frame adjacent the other end thereof, a plurality of filter plates slidably supported on said frame between said first and second press head plates, a drive for moving said second press head plate longitudinally along said frame between a first closed position wherein the plurality of filter plates are snugly horizontally stacked between the press head plates and an open position wherein the second press head plate is spaced sufficiently from the first press head plate to permit slidably displacement of the individual filter plates longitudinally along the frame, and a shifter apparatus for engaging and effecting slidably shifting of individual filter plates longitudinally along said frame, said shifting apparatus including a shifting mechanism disposed for generally linear movement back and forth along the frame in the longitudinal direction thereof, and a driving unit connected to said shifting mechanism for causing said linear stack and forth movement., the improvement wherein said shifting mechanism comprises:

- a carrier supported for said linear back and forth movement;
- a first pawl pivotally mounted on said carrier and defining thereon a first upwardly facing stop, said first pawl being swingable between a raised position permitting said slidable displacement of individual filter plates, and a lowered position;
- spring means coacting only with said carrier and said first pawl for normally urging said first pawl toward said raised position;
- a second pawl pivotally mounted on said carrier and being swingable between a raised position permitting said slidable displacement of individual filter plates, and a lowered position, said second pawl defining thereon a second downwardly-facing stop which is disposed generally vertically above said first upwardly-facing stop, said second pawl being freely pivotally supported on said carrier free of biasing springs, said first and second pawls being positioned such that said second downwardly facing stop is directly contacted by said first upwardly facing to when said first pawl swings toward its raised position, so that said second pawl is carried solely by said first pawl for swinging movement toward its raised position.

6. A filter press according to claim 5, wherein said first pawl defines thereon a first abutment surface for abuttingly contacting one side of a said filter plate, said second pawl defining thereon a second abutment surface for abuttingly contacting an opposite side of a said filter plate, said first and second abutment surfaces being disposed in generally longitudinally spaced but opposed relation to one another, said second pawl having a cam part formed thereon and projecting upwardly therefrom, said cam part defining said second abutment surface on one side thereof and defining a camming surface on the other side thereof.

* * * * *